March 24, 1970 R. E. LASSITER 3,502,065
STEAM HEATING DEVICE
Filed May 3, 1968 2 Sheets-Sheet 1

Rush E. Lassiter
INVENTOR.

BY Arnold, Roylance,
Kruger & Durkee
ATTORNEYS

March 24, 1970    R. E. LASSITER    3,502,065
STEAM HEATING DEVICE
Filed May 3, 1968    2 Sheets-Sheet 2

Rush E. Lassiter
INVENTOR
BY Arnold, Roylance, Kruger & Durkee
ATTORNEYS

United States Patent Office 3,502,065
Patented Mar. 24, 1970

3,502,065
STEAM HEATING DEVICE
Rush E. Lassiter, 1722 W. Thomas St.,
Hammond, La. 70401
Filed May 3, 1968, Ser. No. 726,497
Int. Cl. A21b 1/36
U.S. Cl. 126—20                     11 Claims

ABSTRACT OF THE DISCLOSURE

A steam heating device is provided which includes a couple of apertured plates spaced apart a certain distance in parallel relationship. The lower plate is larger than the upper plate, forming an uncovered peripheral area, and a lid is hingedly connected to fit over the plates so that a peripheral rim on the lid rests on the uncovered area. Steam generating tube construction, timing means and water treatment means are also provided.

BACKGROUND OF THE INVENTION

This invention relates to an improved steam heating device, such device being of the same general type as those steam heating devices disclosed in my prior U.S. Patents Nos. 3,203,414, issued Aug. 31, 1965, and 3,279,450, issued Oct. 18, 1966.

Devices of the type disclosed in this application and in the above-mentioned patents are utilized for the quick heating of foods by treating the foods with steam in a closed chamber. The steam is generated within the chamber, typically by heating water in elongate tubes by means of a gas burner, to a temperature sufficient to transform the water into steam. Many foods can be heated cheaper, and faster using such devices than they can be heated using other prior art apparatus.

The devices such as disclosed in the above-mentioned patents do, however, have certain limitations which restrict their use in certain contexts. For example, it has been determined that the taste of some foods (at least to some individuals) is disadvantageously affected by the steam when using such devices, and some foods are not fully cooked within an economical time period.

These difficulties are presented only in certain instances when heating a few selected foods, and therefore do not by any means render the devices of the above-mentioned patents inefficient for the great majority of operations. Nevertheless, the technological advances in restaurant equipment have been so great recently that restaurant operators and owners are demanding equipment suitable for the solution of all (not just nearly all) problems. Today's customer is primarily concerned with cost and speed of service. Consequently, the emphasis of interest is upon equipment and methods which can do the job faster and cheaper. And of course such methods and equipment must be capable of yielding foods which are pleasing to the taste of the ultimate consumer. Therefore, there is an unending quest for better and better equipment and processes for the cooking of foods.

The apparatus provided by the present invention provides solutions to those problems which do exist with the prior art steam cooking devices. The restaurant operator or home user will readily find that although the devices of the above-mentioned patents are as satisfactory in some contexts as the apparatus of the present invention, the apparatus of this invention is in all cases at least as good as, and in many cases distinctly superior to, the prior art devices. The selection of which of the various foods are better, faster and more tastefully prepared on one device or the other is within the discretion of the individual, because as with all devices of this nature it is the taste of the heated food which is the controlling factor in the final analysis. And of course preference in the taste of food is something which varies from person to person.

Specifically, the problems with the prior art are that it has been difficult in many instances to insure adequate heating, and in others to insure that the food does not become burned. These problems occur because of poor or nonuniform heat distribution to various portions of the cooking apparatus, or in some instances simply because heat distribution is not sufficiently rapid.

It has been determined that fast, proper, and uniform heat distribution to all portions of the heating apparatus is critical to operation of such a steam heating device at least for the cooking of a great many foods. The present invention provides a device which is simple to construct and operate, and yet which provides critical parameters to insure the proper operation of the device in all instances and with all foods. Consequently, the present device overcomes the various disadvantages of the prior art apparatus.

SUMMARY OF THE INVENTION

This invention provides a steam heating apparatus for rapid and thorough heating of foods. The device has a removable lid or hood which covers a chamber in which steam is generated and food is heated.

Inside the chamber there is disposed a couple of metal plates. These plates are disposed in parallel relationship and are spaced apart a specified and critical distance. The separation between the plates is such that in every instance sufficient and thorough heating of the foods is provided, while also in every instance overheating of the foods is prevented.

Means are included to insure that the heat imparted to the apparatus is rapidly and uniformly distributed to all portions of the apparatus.

In some embodiments of the invention, other features are provided to insure operation distinctly superior to that obtainable with prior art apparatus. Such features include the provision of automatic timing means to allow for the injection of water only at preselected intervals, a novel steam conduit arrangement, and a superior system for preventing fouling of the steam tubes.

BRIEF DESCRIPTION OF THE DRAWINGS

In order that the construction and operation of the invention may be more clearly understood, the invention will be described in terms of certain illustrated embodiments, which are illustrated in the accompanying drawings which form a part of this specification and wherein.

DESCRIPTION OF THE ILLUSTRATED EMBODIMENTS

Figure 1:
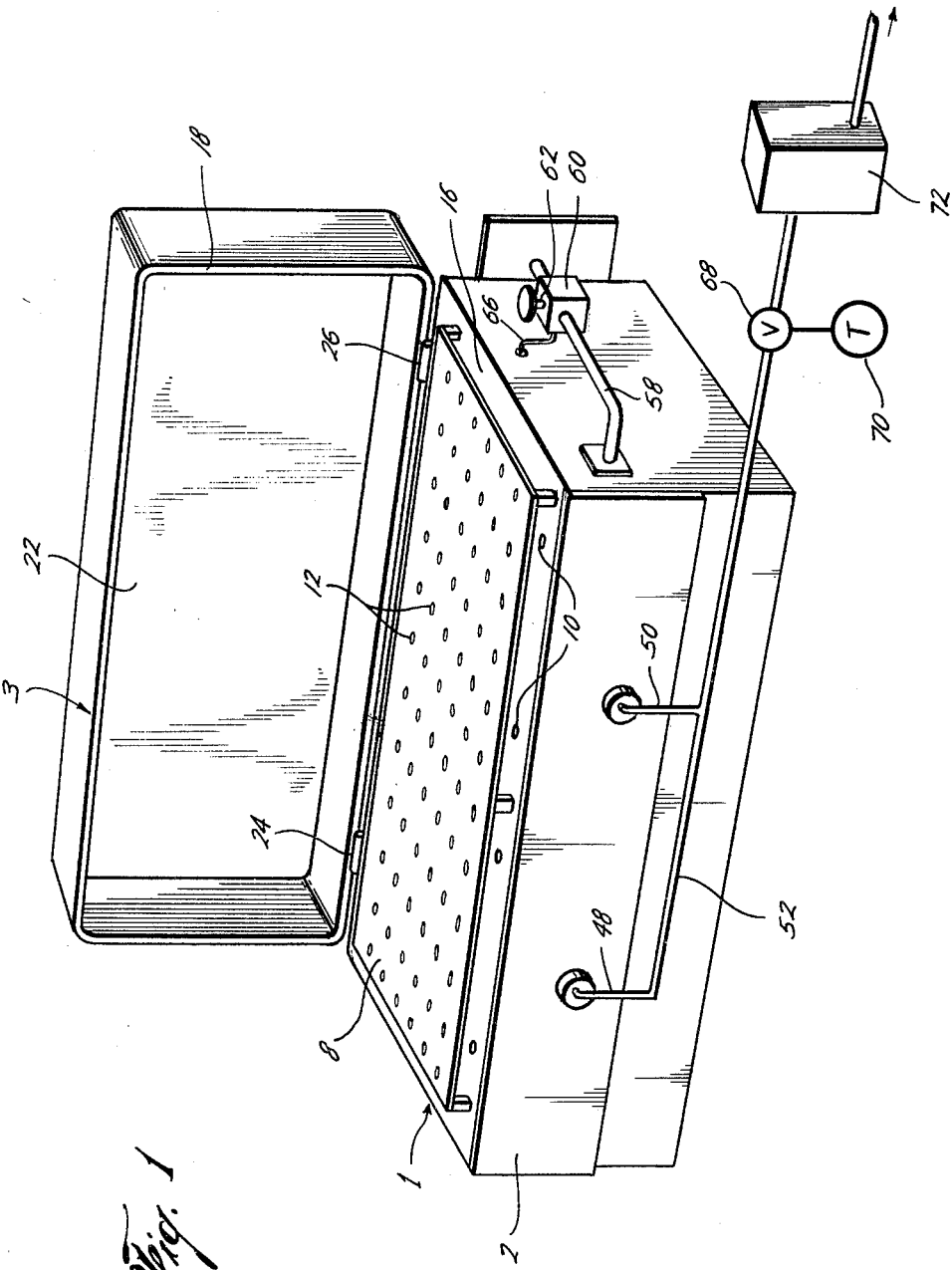
FIGURE 1 is a pictorial view of apparatus constructed in accordance with one embodiment of this invention.
Figure 2:
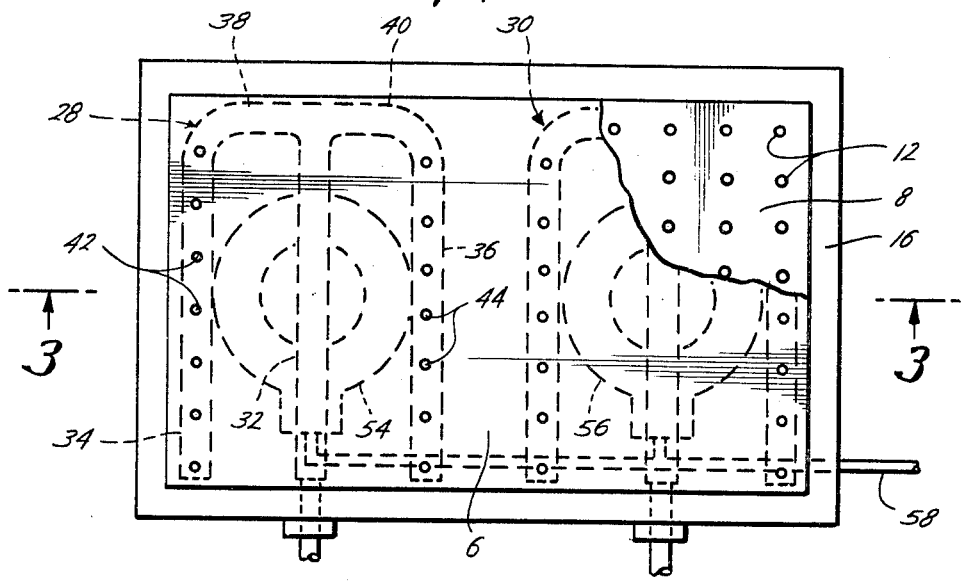
FIGURE 2 is a top view of a portion of the apparatus illustrated in FIGURE 1, partially cut away.
Figure 3:
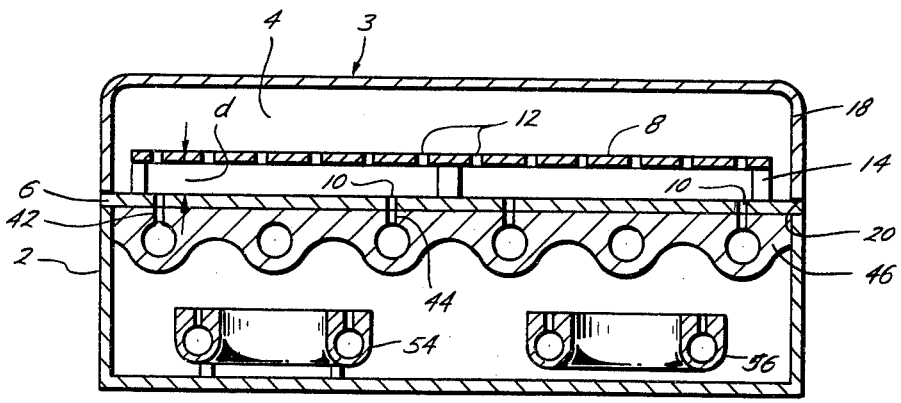
FIGURE 3 is a view along the line 3—3 of FIGURE 2.

The embodiments illustrated in the accompanying drawings are the embodiments preferred by the inventor at the time of application for patent. It will be understood by those skilled in the art that various changes and modifications may be made in these embodiments without departing from the scope of the invention, which is defined only by the claims which follow this specification.

Referring now in more detail to the illustrated embodiments, steam heating device 1 is comprised generally of a lower frame portion 2 and a removable cover or lid 3. The lid 3 is desirably constructed of a generally flat portion 22 and a rim portion 18 which encircles the flat portion 22 around the entire periphery thereof. The lid 3 is hingedly connected to the frame portion 2 by means of the hinges 24 and 26, so that it may be swung open to insert food into the apparatus or remove food therefrom, and easily closed onto the frame 2 to form an enclosed chamber 4 into which foods may be placed for heating.

The lower frame portion 2 is generally box-like in configuration and the top portion thereof is defined by a flat plate 6 which abuts the lower frame around the periphery thereof. Spaced above the plate 6 in the central portion thereof, but spaced back from the peripheral edges of the plate 6 on all sides, is another flat plate 8. The plate 8 is disposed parallel to the plate 6 and is spaced apart from the plate 6 by a distance $d$ which is uniform throughout the area of the plate 8.

The plate 6 is provided with a plurality of apertures 10, and the plate 8 is provided with a plurality of apertures 12. These apertures are in substantial alignment in the embodiments shown, but they may be offset if it is so desired. The number of apertures in the plate 8 will generally be great in comparison with the number in the plate 6, because steam emitting from plate 6 will fan out before contacting plate 8. It is onto the plate 8 that food is placed for heating.

Any convenient means may be included for maintaining the plate 8 in its parallel spaced apart relationship above the plate 6. Such means may take the form of the spacer pins 14, any number of which may be welded or otherwise secured to each of the plates 6 and 8.

The construction and arrangement of the plates 6 and 8 in the manner illustrated so that the plate 6 is significantly larger than the plate 8, and the plate 8 is substantially centrally disposed over the plate 6, provides for a relatively large peripheral area 16 around the plate 6 which is not covered by the plate 8. The lid 3 is constructed so as to include a downwardly projecting rim 18 around the periphery thereof, the flat bottom portion 20 of which is adapted to abut the area 16 of the plate 6 when the lid is closed to cover the frame portion 2 of the apparatus.

Means are included in the apparatus for rapidly and efficiently providing steam heat to the chamber 4 into which food is disposed for heating, and for assuring substantially uniform dispersion of the heat throughout the heating chamber. Such means desirably include one or more tube arrangements, two such arrangements 28 and 30 being illustrated in this embodiment. Each such arrangement 28 and 30 is of a configuration resembling a 3-prong pitchfork, and includes a central tube 32 and a couple of side prongs 34 and 36 parallel to the central tube and on either side thereof. Central tube 32 is joined to the side prongs 34 and 36 by U-shaped tube sections 38 and 40, respectively. The side prongs 34 and 36 are provided with a plurality of apertures 42 and 44, respectively, which mate with apertures 10 in the plate 6; no apertures are provided in the central prong 32. The tube arrangements 28 and 30 are disposed in a casting 46 which will be more fully described below.

The central tubes 32 of each of the tube arrangements 28 and 30 communicate through the housing 2 with lines 48 and 50, each of which in turn communicate with water supply line 52. Water supply line 52 is in fluid communication through appropriate apparatus with a source of water (not shown).

Beneath each of the arrangements 28 and 30 is positioned means for heating the water in the central tubes 32 to generate steam. Such means desirably comprise the burners 54 and 56 which may be of any convenient configuration. The burners 54 and 56 are supplied by gas supply line 58 which is in communication through the housing 2 to a source of gas under pressure. Gas flow to the burners 54 and 56 is regulated by a suitable valve such as the valve 60 controlled by a thermostat 62 which is set by the control dial 64. Temperature sensing element 66 extends from the thermostat 62 into the area between the plates 6 and 8 so that the temperature within that area may be controlled by a predetermined setting of the control dial 64. If the temperature of the area between the plates 6 and 8 exceeds the predetermined setting on the dial 64, the thermostat 62 will restrict gas flow through the line 58 and control the addition of heat emitting from the burners 54 and 56.

Any suitable fuel, and any suitable combustion system, may be conveniently employed in conjuction with the invention.

In the water supply line 52 is disposed suitable flow control means such as the valve 68, which may be of any convenient type such as that illustrated in my earlier Patents 3,203,414 and 3,279,450. The valve 68 may be operably connected to timing means such as the timer 70. Timer 70 may take any suitable form, the construction and operation of such devices being well known to those of skill in the art. Through its operative connection to the valve 68, the timer may be set to allow flow through the valve 68 for a short time interval, thereby permitting only periodic slugs of water to enter the water supply line. One example of a suitable cycle is off for 15 seconds, then on for less than one second. In this manner, steam is formed in small amounts at spaced apart intervals, and consequently food may be retained in the apparatus for relatively long periods of time without becoming overheated. The combination of timing means with the steam heating apparatus of this invention has been found to give exceptionally good results in restaurant operations. Provision is made for detachment of the timing means so that manual operation may be employed during rush periods of operation.

Also desirably included in the water supply line 52 is means for treating the entering water such as a demineralizing or deionizing chamber such as the cartridge 72. Such chambers are well known to those of skill in art—they typically contain in a generally tubular housing a packed column of beads formed of ion-exchange resin. One example of a suitable unit 72 is the unit obtainable from the Continental Water Conditioning Company. Water entering the cartridge through the bottom of the column passes upwardly to the outlet, and upon passage through the packed column is deionized. Particularly advantageous in the use of such apparatus is the fact that the water generated into steam in the tubes 32, etc., will not form a residue or scale and thereby will not foul the tubes. In this manner, cleaning of the various tubes is not required.

Materials of construction are important to this invention. The plates 6 and 8, tubes 32, 34, 36, etc., lid 3 and casting 46 must each be constructed of material which will rapidly transfer heat. All are preferably constructed of metal. Specifically, the tubes are preferably constructed of brass, and the casting 46 and lid 3 are preferably constructed of aluminum. The casting 46 is in intimate contact with all portions of the tubes 32, 34, 36, etc., and may if desired be constructed integral with the plate 6. Rapid and uniform distribution of heat to all portions of the apparatus is assured by the construction herein employed. For example, construction of the lid in the manner described allows the lid to contact the heated plate 6 around the entire periphery of the lid, thereby assuring rapid and uniform heat transfer to all portions of the lid. Further, all portions of the tubes are rapidly and substantially uniformly heated by rapid heat transfer through the casting 46.

Provision of apertures in the side prongs 34 and 36 of the tube arrangements 28 and 30, but not in the central tubes 32, together with rapid heating of the tubes through the casting 46, assures that the steam will be superheated by the time it is emitted through the bottom plate 6. In this manner, the emission of wet steam is prevented and thereby foods in the device are prevented from becoming soggy and unedible. While it is important that foods do not become soggy, it is equally important that they do not dry out in the unit. This unit serves to keep foods from becoming too dry as in other types of ovens, just as it prevents them from becoming too wet. For example, French bread heated in this unit assumes a condition just like its condition upon leaving the oven.

Construction of the casting 46 from a highly heat-transferrable material such as aluminum is desirable not only because it assures rapid heating of the tubes 32, 34, 36, etc., but also because it assures rapid heat transfer to even the outermost edges of the plate 6. In this manner, food placed on the outer edge of the plate 8 will be heated just as rapidly as that placed in the center—or on any other portion of—the plate.

One of the important features of the invention is the provision of the space $d$ between the plates 6 and 8. In prior art units of the general type as here provided, great difficulty has been experienced in assuring adequate heating of the foods while still assuring in every instance that food would not become overheated or burned. This is an especially difficult problem since some foods will of course be adequately heated at a temperature much less than will certain other foods. And when it is noted that the steam temperature is usually on the order of 600° F. and at a pressure of something like 150 p.s.i., it is easy to recognize the difficulty facing the operator, of assuring adequate heating while preventing buring and overheated.

It has been found necessary in most models to provide a spacing $d$ of from about ⅛ inch to about 1½ inches. In almost all applications, the spacing $d$ should be between ¼ inch and ¾ inch, around ⅜ inch being especially preferred in many contexts of use. It is noted that if the unit is larger than usual or smaller than usual, the distance $d$ may be altered accordingly. Therefore, in very large units, $d$ might be as great as 8 inches, and in small units it might be as little as 1/32 inch.

By providing plates 6 and 8 constructed in the manner described above and spaced apart a distance $d$ as specified, results greatly exceeding those obtainable with prior art apparatus have been realized. Actual experimental tests in restaurant operations have shown that no foods have been burned, and all foods have been adequately heated and tastefully prepared.

The temperature of operation of this device will be on the other of 300–400° F., with the 350–400° F. range being generally preferred. It will be understood that operation of the unit at near 400° F. will require greater spacing of the plates, and hence a larger value of $d$, than operation at near 300° F. But the above ranges given for $d$ are important throughout the complete operable temperature range.

As mentioned above, structural changes may be made without departing from the scope of the invention. For example, although the embodiment disclosed has shown only one set of plates 6, 8 and lid 3, an alternative employing two or more such plates, etc., such as illustrated in the prior Patents 3,203,414 and 3,279,450, could be employed.

Another structural change within the scope of this invention is that mentioned earlier in this specification—namely, construction of the plate 6 and casting 46 all as one piece. While it is important that the plate 8 be generally flat, it is not necessary that the plate 6 be so. Consequently, the sinuous surface of the casting 46 could be upturned rather than down-turned as shown in the illustrated embodiment.

What is claimed is:

1. Apparatus for steam-heating foods to insure adequate heating of the foods while preventing overheating and burning of the foods, comprising:
    a lower frame housing;
    a first apertured metal plate defining the top portion of said housing;
    a second generally flat apertured metal plate suitable for receiving articles of food thereon,
        said second plate being disposed parallel to said first plate and being spaced apart therefrom by a distance of between about ⅛ inch and about 1½ inches;
    a cover hingedly connected to said housing and adapted to be positioned over said housing to define a heating chamber between said cover and said second plate;
    means for introducing water into said housing, said means including
        a water supply line communicating with a source of water, and
        a tube arrangement in said housing below said first plate, said tube arrangement being constructed so that a portion thereof is provided with a plurality of apertures for the release of steam to said heating chamber, and another portion thereof is not provided with such apertures, in a manner such that steam is superheated by the time it is released through said apertures;
    a metal casting surrounding said tube arrangement and abutting said first plate so that heat is readily transferred from said tubes through said casting to said first plate; and,
    means for heating said water in the area beneath said first plate, sufficiently to effect the generation of steam whereupon said steam passes through said first and second plates to heat the articles of food positioned on said second plate.

2. Apparatus in accordance with claim 1, wherein said tube arrangement is comprised of an elongate central tube connected at one end thereof to a couple of side tubes parallel to said central tube and on either side thereof, said central tube being nonapertured while said side tubes each have a number of apertures therein.

3. Apparatus in accordance with claim 1, wherein said metal casting is integral with said first plate.

4. Apparatus in accordance with claim 1, wherein said means for introducing water into said housing includes automatic timing means, whereby amounts of water can be transferred to said housing only at selected time intervals.

5. Apparatus for steam-heating foods to insure adequate heating of the foods while preventing overheating and burning of the foods, comprising:
    a lower frame housing;
    a first apertured metal plate defining the top portion of said housing;
    a second generally flat apertured metal plate suitable for receiving articles of food thereon,
        said second plate being disposed parallel to said first plate and being spaced apart therefrom by a specified distance, said distance being selected to insure adequate heating while preventing overheating and burning of the food, and
        said second plate being smaller in size than said first plate and approximately centrally disposed above said first plate, thereby leaving an uncovered peripheral area around said first plate which is not beneath said second plate,
        said uncovered peripheral area being suitable for the receipt of a cover rim portion;
    a cover hingedly connected to said housing and adapted to be positioned over said housing to define a heating chamber between said cover and said second plate, said cover including
        a generally flat central portion, and
        a rim around the periphery thereof, said rim projecting toward said housing and adapted to be received by said uncovered peripheral area of said first plate;
    means for introducing water into said housing, said means including
        a water supply line communicating with a source of water, and
        a tube arrangement in said housing below said first plate, said tube arrangement being constructed so that a portion thereof is provided with a plurality of apertures for the release of steam to said heating chamber, and another portion thereof is not provided with such apertures, in a manner such that steam is superheated by the time it is released through said apertures;

a metal casting surrounding said tube arrangement and abutting said first plate so that heat is readily transferred from said tubes through said casting to said first plate; and, means for heating said water in the area beneath said first plate, sufficiently to effect the generation of steam whereupon said steam passes through said first and second plates to heat the articles of food positioned on said second plate.

6. Apparatus in accordance with claim 5, wherein said distance is between about 1/8 inch and about 1½ inches.

7. Apparatus in accordance with claim 5, wherein said distance is between about ¼ inch and about ¾ inch.

8. Apparatus in accordance with claim 5, wherein said metal casting is integral with said first plate.

9. Apparatus in accordance with claim 5, wherein said means for introducing water into said housing includes automatic timing means, whereby amounts of water can be transferred to said housing only at selected time intervals.

10. Apparatus for steam-heating foods to insure adequate heating of the foods while preventing overheating and burning of the foods, comprising:

a lower frame housing;

a flat apertured metal plate defining the top portion of said housing;

a second generally flat apertured metal plate suitable for receiving articles of food thereon, said second plate being disposed parallel to said first plate and being spaced apart therefrom by by a specified distance, said distance being selected to insure adequate heating while preventing overheating and burning of the food, and said second plate being smaller in size than said first plate and being approximately centrally disposed above said first plate, thereby leaving an uncovered peripheral area around said first plate which is not beneath said second plate, said uncovered peripheral area being suitable for the receipt of a cover rim portion;

a cover hingedly connected to said housing and adapted to be positioned over said housing to define a heating chamber between said cover and said second plate, said cover including a generally flat central portion, and a rim around the periphery thereof, said rim projecting toward said housing and adapted to be received by said uncovered peripheral area of said first plate;

means for introducing water into said housing, said means including a deionization chamber wherein water upon evaporation leaves no residue on the tube in which steam generation occurs; and, means for heating said water in the area beneath said first plate, sufficiently to effect the generation of steam whereupon said steam passes through said first and second plates to heat the articles of food positioned on said second plate.

11. Apparatus for steam-heating foods to insure adequate heating of the foods while preventing overheating and burning of the foods, comprising:

a lower frame housing;

a flat apertured metal plate defining the top portion of said housing;

a second generally flat apertured metal plate suitable for receiving articles of food thereon, said second plate being disposed parallel to said first plate and being spaced apart therefrom by a specified distance, said distance being selected to insure adequate heating while preventing overheating and burning of the food, and said second plate being smaller in size than said first plate and being approximately centrally disposed above said first plate, thereby leaving an covered peripheral area around said first plate which is not beneath said second plate, said uncovered peripheral area being suitable for the receipt of a cover rim portion;

a cover hingedly connected to said housing and adapted to be positioned over said housing to define a heating chamber between said cover and said second plate, said cover including a generally flat central portion, and a rim around the periphery thereof, said rim projecting toward said housing and adapted to be received by said uncovered peripheral area of said first plate;

means for introducing water into said housing, said means including automatic timing means whereby amounts of water can be transferred to said housing only at selected time intervals; and, means for heating said water in the area beneath said first plate, sufficiently to effect the generation of steam whereupon said steam passes through said first and second plates to heat the articles of food positioned on said second plate.

References Cited

UNITED STATES PATENTS 3,279,450  10/1966  Lassiter _____ 126—20

CHARLES J. MYHRE, Primary Examiner

U.S. Cl. X.R.

126—369

UNITED STATES PATENT OFFICE
CERTIFICATE OF CORRECTION

Patent No. 3,502,065                        March 24, 1970

Rush E. Lassiter

It is certified that error appears in the above identified patent and that said Letters Patent are hereby corrected as shown below:

Column 5, line 39, "other" should read -- order --. Column 8, line 24, "covered" should read -- uncovered --.

Signed and sealed this 8th day of December 1970.

(SEAL)
Attest:

Edward M. Fletcher, Jr.                    WILLIAM E. SCHUYLER, JR.
Attesting Officer                                Commissioner of Patents